(12) United States Patent
Raphael et al.

(10) Patent No.: US 8,526,920 B2
(45) Date of Patent: Sep. 3, 2013

(54) VISUAL VOICEMAIL UNAVAILABILITY SOLUTION

(75) Inventors: Alison Raphael, San Francisco, CA (US); David Ingram, Richardson, TX (US); Dionne Pignatiello, Seattle, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 13/482,308

(22) Filed: May 29, 2012

(65) Prior Publication Data

US 2012/0238249 A1 Sep. 20, 2012

Related U.S. Application Data

(63) Continuation of application No. 12/635,233, filed on Dec. 10, 2009, now Pat. No. 8,199,889.

(51) Int. Cl.
| H04L 12/58 | (2006.01) |
| H04M 1/725 | (2006.01) |
| H04M 11/10 | (2006.01) |
| H04W 4/12 | (2009.01) |
| H04L 29/08 | (2006.01) |

(52) U.S. Cl.
CPC ............ H04W 4/12 (2013.01); H04L 12/5895 (2013.01); H04L 29/08108 (2013.01)
USPC ..................... 455/412.1; 455/412.2; 455/413; 379/88.25; 340/500; 715/758; 348/14.06

(58) Field of Classification Search
USPC .................. 455/412.1, 412.2, 413; 370/352; 340/500; 715/758; 379/88.25; 348/14.06
See application file for complete search history.

(56) References Cited

U.S. PATENT DOCUMENTS

| 7,697,667 | B1 | 4/2010 | Wageman et al. |
| 8,195,130 | B2 * | 6/2012 | Hao et al. ................... 455/412.1 |
| 8,199,889 | B2 * | 6/2012 | Raphael et al. ............ 379/88.25 |
| 2010/0149300 | A1 * | 6/2010 | Zubas et al. ............... 348/14.06 |
| 2010/0151831 | A1 * | 6/2010 | Hao et al. ................... 455/412.2 |
| 2011/0019662 | A1 * | 1/2011 | Katis et al. .................... 370/352 |
| 2011/0035687 | A1 * | 2/2011 | Katis et al. .................... 715/758 |
| 2011/0117887 | A1 * | 5/2011 | Shaw et al. ................ 455/412.2 |
| 2011/0143721 | A1 * | 6/2011 | Raphael et al. .............. 455/413 |
| 2012/0001748 | A1 * | 1/2012 | Ladouceur et al. .......... 340/500 |
| 2012/0238249 | A1 * | 9/2012 | Raphael et al. .............. 455/413 |

* cited by examiner

*Primary Examiner* — William D Cumming
(74) *Attorney, Agent, or Firm* — Woodcock Washburn LLP

(57) ABSTRACT

A solution for notifying a user of alternate means of accessing voicemail data utilize a timer that can be set on a user device upon receipt of a message waiting indicator. When the timer expires, if no data communications connection has been established between the user device and a voicemail server, the user device can present alternate voicemail access instructions to the user. These instructions may be obtained from the message waiting indicator or may be stored on the user device. In another embodiment, a voicemail server sets a timer after sending a message waiting indicator to a user device. The voicemail server sends a message containing alternate voicemail access instructions if no connection has been established between the voicemail server and the user device upon expiration of the timer.

20 Claims, 9 Drawing Sheets

VISUAL VOICEMAIL UNAVAILABILITY SOLUTION

CROSS REFERENCE TO RELATED APPLICATIONS

This application is a continuation of U.S. application Ser. No. 12/635,233, now U.S. Pat. No. 8,199,889, filed on Dec. 10, 2009, entitled "Visual Voicemail Unavailability Solution," which is hereby incorporated by reference in its entirety.

TECHNICAL FIELD

The technical field generally relates to wireless communications and more specifically relates to client notification of visual voicemail availability.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities, the ability to communicate with data networks such as the internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. A user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server.

Currently visual voicemail systems require that a user device, such as a mobile telephone, request and download visual voicemail data for new voicemails, usually in response to a notification sent from a voicemail server to the user device indicating that a new voicemail is available. This notification may be sent to a user device using means that do not require the establishment of a data communications session. In order to download such data, however, a user device must request and establish a data communications session between the user device and a device in a wireless provider network, such as a voicemail server. When viewed in light of the Open System Interconnection Reference Model ("OSI Model") communication between a visual voicemail client and a device in a wireless provider network may occur at the application layer using a communications session established at the transport layer, such as a transmission control protocol (TCP) session. For example, a packet data protocol (PDP) context may be activated for a user device by the operating system of the user device. This establishes communications configurations, such as an Internet protocol (IP) address, tunnel identifications, etc., that may be necessary or desired in order to set up a data communications session. Then, a data communications session, such as TCP session, may be established between an application running on the user device and a network device, such as a voicemail server. Once a session is established, a voicemail server may communicate with a user device at the application layer and transmit visual voicemail data to a user device. However, if for some reason a user device is unable to establish a data communications session, for example due to data network connectivity issues or inability to activate a PDP context, the user may not be able to gain access to a new voicemail, may not be notified of a new voicemail at all, or may not be aware of alternate methods of accessing a new voicemail.

SUMMARY

Systems, apparatuses, and methods for providing visual voicemail unavailability solutions are disclosed. In one embodiment, a message waiting indicator or other message sent to a user device to notify the user that a new voicemail is available may contain an instruction directing the user device to set a timer. Upon expiration of the timer, if the user device has not established communications with a voicemail server in order to download visual voicemail data, then the user device may provide alternate voicemail access instructions to a user. These instructions may be contained in the message waiting indicator or may be preconfigured on the user device. Alternatively, a user device maybe configured to automatically set a timer upon receipt of a message waiting indicator and present alternate voicemail access instructions to a user upon expiration of the timer if no communications have been established with a voicemail server.

In another embodiment, a voicemail server may set a timer upon transmitting a message waiting indicator to a user device. If the voicemail server has not established a communications connection with the user device upon expiration of the timer, the voicemail server may transmit another message to the user device containing alternate voicemail access instructions. In some embodiments, the time period used for the timer may be user or administrator configurable, while in other embodiments the timer period is not configurable after initial configuration. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
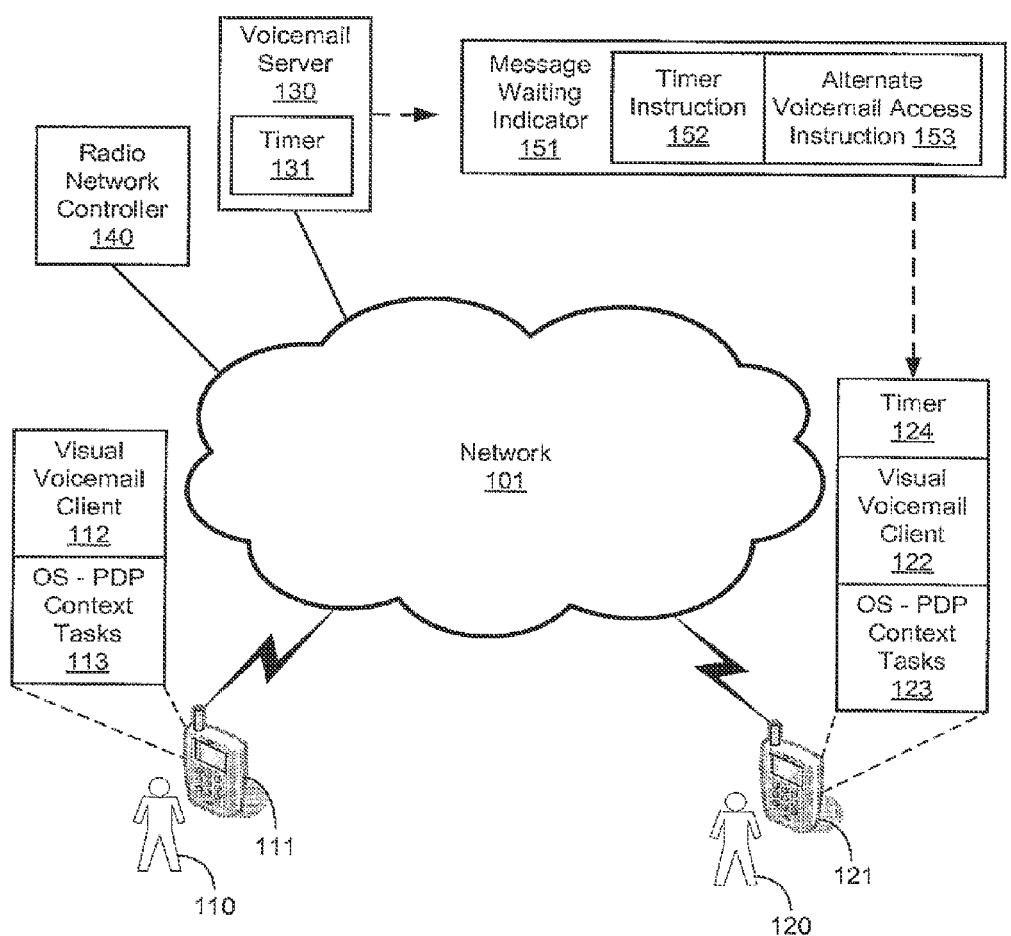
FIG. 1 is a block diagram of a non-limiting, exemplary network environment in which visual voicemail unavailability solutions may be implemented.

FIG. 1 illustrates a network environment in which one or more embodiments of a visual voicemail system may be implemented. User 110 may operate wireless device 111, and user 120 may operate wireless device 121. Each of wireless devices 111 and 121 may be any type of wireless mobile communications device, including a mobile telephone, smart phone, personal data assistant (PDA), mobile computer, wireless email device, wireless television set-top device or any other wireless network connectivity device, or any combination thereof. Alternatively, while wireless devices 111 and 121 as illustrated represent wireless mobile communications devices, wireless devices 111 and 121 may also represent a wired device, such as a landline telephone, computer, email device, wired television set-top device or any other wired network connectivity device, any other wired or wireless communications device or any combination thereof. All such embodiments are contemplated as within the scope of the present disclosure.

Wireless devices 111 and 121 may communicate with network 101. Network 101 may be any type of network capable of providing wireless services to wireless devices of any type. Network 101 represents any number of interconnected networks that may be composed of any number and type of wired and/or wireless network devices. Network 101 may enable wireless devices 111 and 121 to communicate with each and with other mobile devices. Additionally, network 101 may enable wireless devices 111 and 121 to communicate with computing devices such as voicemail server 130 and other servers accessible via network 101 such as web servers. Such communication may be voice, data, or a combination thereof. All such embodiments are contemplated as within the scope of the present disclosure.

User 110 may wish to call user 120 by operating wireless device 111. Upon dialing the phone number associated with wireless device 121, user 110 may be connected to a voicemail system that allows user 110 to create a voicemail for user 120. This may be because user 120 fails to answer the call placed by user 110, or because wireless device 121 is unavailable for some reason, such as being located in an area with no wireless network coverage or being shut off. In an alternative embodiment, user 110 may initiate a voicemail unprompted, or may be responding to a voicemail created by user 120. Alternatively, user 110 may wish to send a voicemail to user 120 without directly calling wireless device 121, and may interact with a voicemail system to create and send the voicemail to user 120.

In one embodiment, such interaction may be performed through the use of visual voicemail client 112, which may be any software, hardware, or combination of software and hardware configured to allow user 110 to interact with a visual voicemail system by operating wireless device 111. Such software may be configured to interact with voicemail server 130 and/or related systems or components. Alternatively, such software may perform some or all of the processing required to gather the information for generating a voicemail. In another alternative, no specialized visual voicemail client may be configured on wireless device 111, and all necessary voicemail data gathering may be accomplished through wireless device 121 by voicemail server 130 and/or related systems or components. In such a system, the visual voicemail interface presented to user 110 may be web-based, and may be presented within a webpage displayed on wireless device 111 using appropriate software such as a web browser.

In order to communicate with network 101, operating system 113 of wireless device 111 may request activation by network 101 of a PDP context. Such a request may be transmitted to a device such as radio network controller (RNC) 140. This request may enable network layer communications between wireless device 111 and network 101. Once a PDP context is activated, visual voicemail client 112 may establish a transport layer communications session and, in some embodiments, higher layer sessions to communicate at the application layer with voicemail server 130 and/or related systems or components. In one embodiment, visual voicemail client 112 may communicate with operating system 113 to inform operating system 113 of the status of visual voicemail client 112. For instance, visual voicemail client 112 may inform operating system 113 when the communications session between visual voicemail client 112 and voicemail server 130 is needed or should be terminated.

In one embodiment, an exemplary voicemail system may be operated, at least in part, by voicemail server 130, which may be associated with a network that provides wireless communications services to either or both user 110 and user 120. Alternatively, voicemail server 130 may be owned, operated, or maintained by a third party, and may be a component of a third party system that provides voicemail services to the operator of network 101 or any other network operator. Voicemail server 130 may be any one or more computing devices and/or software capable of performing voicemail functions as described herein. Voicemail server 130 may be dedicated to performing voicemail functions, or may be a component of a device or system that performs other functions in addition to voicemail functions.

Upon communicating with voicemail server 130, user 110 may be provided with aural prompts that allows user 110 to interact with voicemail server 130. Voicemail server 130 may solicit and store an audible voice message portion of a voicemail from user 110 using traditional telephony means. Alternatively, voicemail server 130 may provide other types of interfaces, such as graphical or visual interfaces, to user 110 for gathering voicemail data. Voicemail server 130 may also prompt user 110 to attach or associate multimedia content with the voicemail, and may obtain and associate such content with the voicemail. Voicemail server 130 may acquire or obtain through various means other information, either automatically or by prompting user 110 for such information, that may be associated with or assist in generating content for the voicemail. Note that any or all of the above-listed actions performed by voicemail server 130 may instead, or also, be performed by the recipient's wireless device, such as wireless device 121. Once all information needed has been gathered by voicemail server 130 and the interaction with user 110 is complete, voicemail server 130 and/or related components or systems may generate and transmit a notification such as message waiting indicator 151, and/or other data that a new voicemail is available. In one embodiment, message waiting indicator 151 is sent using short message peer-to-peer protocol (SMPP) message, and may take the form of short message service (SMS) message. Alternatively, any other type of message or protocol may be used to send a message waiting indicator or similar message to a recipient device.

In a typical voicemail process, message waiting indicator 151 may be received on wireless device 121 and may be presented to user 120, in one embodiment through the use of visual voicemail client 122, which may be software, hardware, or a combination of software and hardware that presents a visual voicemail interface on a display of wireless device 121 and/or otherwise allows user 120 to interact with a visual voicemail system by operating wireless device 121. Such software may be configured to interact with voicemail server 130 and/or related systems or components. Such software may function merely as a front end, with all processing of voicemail and related data performed by voicemail server 130 and/or related systems or components. Alternatively, such software may perform some or all of the processing required to present the visual voicemail interface. In another alternative, no specialized visual voicemail software may be configured on wireless device 121, and all necessary voicemail presentation data may be transmitted to wireless device 121 by voicemail server 130 and/or related systems or components. In such a system, the visual voicemail interface presented to user 120 may be web-based, and may be presented within a webpage displayed on wireless device 121 using appropriate software such as a web browser. All other alternate configurations and combinations thereof are contemplated as within the scope of the present disclosure.

In some embodiments, a confirmation of receipt of message waiting indicator 151 may be transmitted to network 101 by wireless device 121. Alternatively, a request for voicemail data received via data packet communications protocol at voicemail server 130 or an other device may serve as confirmation of receipt of message waiting indicator 151. As with wireless device 111, in order to communicate using data packet protocols with network 101, operating system 123 of wireless device 121 may request activation by network 101 of a PDP context in order to allow visual voicemail client 122 to communicate with voicemail server 130 or other voicemail servers or systems. Such a request may be automatically generated by some component of wireless device 121 in response to detecting the receipt of message waiting indicator 151. Such a request may be transmitted to a device such as radio network controller (RNC) 140. This request may enable network layer communications between wireless device 121 and network 101. Once a PDP context is activated, visual voicemail client 122 may establish a transport layer communications session and, in some embodiments, higher layer sessions to communicate at the application layer with voicemail server 130 and/or other voicemail systems or components. In one embodiment, visual voicemail client 122 may communicate with operating system 123 to inform operating system 123 of the status of visual voicemail client 122. For instance, visual voicemail client 122 may inform operating system 123 when the communications session between visual voicemail client 122 and voicemail server 130 is terminated. Operating system 123 may be configured to maintain, or to not request deactivation, of the established PDP context until it is informed by visual voicemail client 122 that the communications session between visual voicemail client 122 and voicemail server 130 is terminated.

However, there may be situations where establishing a data packet protocol communications session is not possible. This may be due to network, hardware, or software failures, misconfigurations, or malfunctions on either a user device or a network device, or both. In such a situation, a user may still be able to retrieve voicemail and voicemail related data, but may not be aware of how to do so or that such options exist. In such a situation, in one embodiment, a notification of alternative options for accessing voicemail and related data may be presented to a user.

In one embodiment, an end user device, such as wireless device 121 or 111, may be configured to detect an instruction within a message waiting indicator that prompts the end user device to start a timer. For example, wireless device 121 may receive message waiting indicator 151 that includes timer instruction 152 and alternate voicemail access instruction 153. Timer instruction 152 may be detected by visual voicemail client 122, operating system 123, or one or more other components of wireless device 121. Timer instruction 152 may include a specified amount of time to which timer 124 may be set, or wireless device 121 may be configured to set timer 124 to a predetermined amount of time upon detection of timer instruction 152. In response to detecting timer instruction 152, the detecting component may set timer 124 or send one or more instructions to another component to set timer 124. This timer may be used by wireless device 121 and/or component therein to determine if and when to present alternate voicemail access instruction 153 to a user. Timer 124 may be set to any desired amount of time, and may be user configurable through visual voicemail client 122 or another component of wireless device 121. Alternatively, timer 124 may be set to a preconfigured amount of time that is not under the control of the user. Any amount of time and any means of determining or setting the amount of time for timer 124 are contemplated as within the scope of the present disclosure.

In one embodiment, upon receiving message waiting indicator 151, visual voicemail client 122 and/or operating system 123 of wireless device 121 will attempt to establish, automatically or responsive to user input, a data communications session with voicemail server 130. If the data communications session is not fully established before timer 124 expires, then visual voicemail client 122 and/or operating system 123 of wireless device 121 may present alternate voicemail access instruction 153 to the user of wireless device 121. Alternate voicemail access instruction 153 may include text such as "Visual voicemail unavailable, please press and hold '1' to access voicemail" or any other message that conveys an alternate means to access voicemail to a user. Alternate voicemail access instruction 153 as presented to a user may take the form or a visual display of text or graphics, or an audible notification, or any combination thereof. For example, if wireless device 121 is unable to activate a PDP context or unable to establish a TCP session with voicemail server 130 before timer 124 expires, wireless device 121 may be configured to present alternate voicemail access instruction 153 as text on a display of wireless device 121 and beep once. Any other form of notification may be used.

In another embodiment, rather than presenting to a user alternate voicemail access instruction 153 that was derived from message waiting indicator 151, visual voicemail client 122 and/or another component of wireless device 121 may be configured with alternative voicemail access instructions. Upon expiration of timer 124, visual voicemail client 122 and/or another component of wireless device 121 may be configured to present the preconfigured alternate voicemail access instructions to the user through any effective means. This embodiment may reduce the amount of data required to be sent to wireless device since alternate voicemail access instructions are not contained within message waiting indicator 151.

In yet another embodiment, message waiting indicator may contain no timer instruction 152 or any other similar instruction. Instead, visual voicemail client 122 and/or another component of wireless device 121 may be configured to automatically set a timer upon detection of message waiting indicator 151. In such an embodiment, message waiting indicator may include alternate voicemail access instruction 153, and alternate voicemail access instruction 153 may be presented to a user upon expiration of the timer automatically set by visual voicemail client 122 and/or another component of wireless device 121. Alternatively, message waiting indicator 151 may not include timer instruction 152 or alternate voicemail access instruction 153. In such an embodiment, visual voicemail client 122 and/or another component of wireless device 121 may be configured with alternate voicemail access instructions and configured to automatically set a timer and present such alternate voicemail access instructions to a user upon expiration of such a timer. Any other combination of instructions and components that perform such instructions are contemplated as within the scope of the present disclosure.

In an alternative embodiment, a timer may instead be set on the network side of the voicemail system. For example, upon transmitting message waiting indicator 151, voicemail server 130 may set timer 131. Voicemail server 130 may then determine, upon expiration of timer 131, whether a data communications session has been established with wireless device 121. If not, voicemail server 130 may then transmit, or send instructions to the appropriate device or component within network 101 to transmit, a message to wireless device 121 with alternate voicemail access instructions. Such a message may take the form of an SMS message, an automated voice call, or any other type of communication. Because the need for such a message may be the result of an inability of wireless device 121 to establish a packet data communications session with network 101 or devices therein, the message sent by voicemail server 130 with alternate voicemail access instructions may be sent using protocols and/or means that do not require establishing a packet data communications session with wireless device 121.

Figure 2:
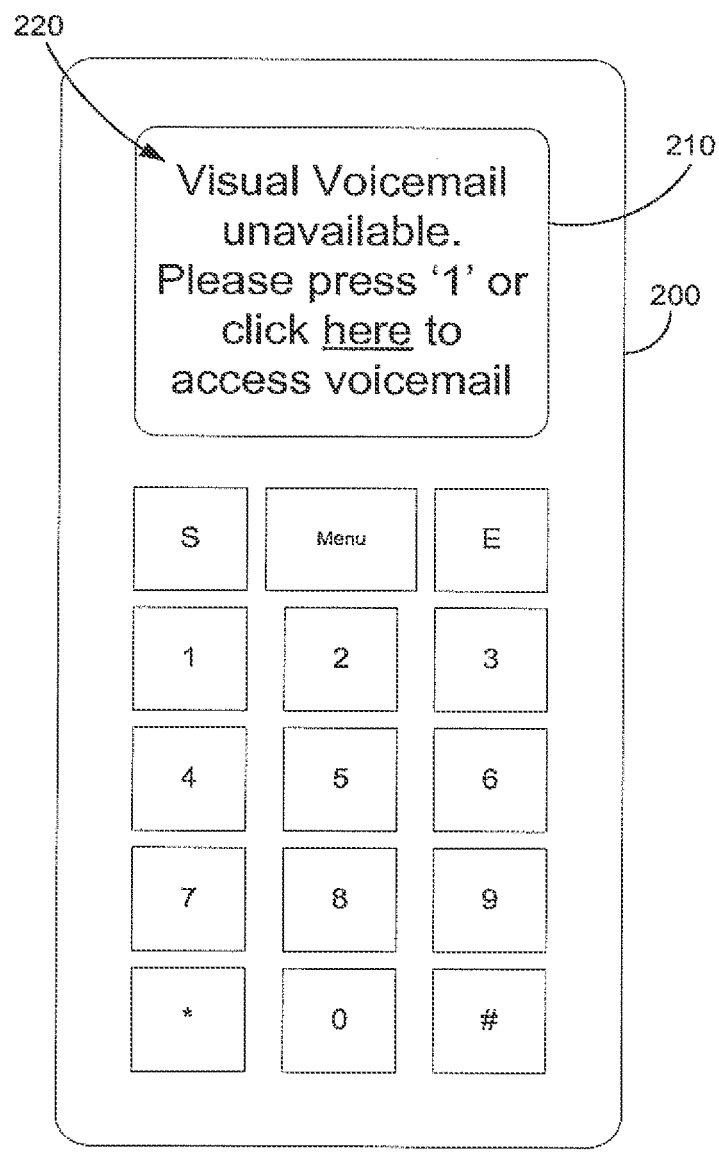
FIG. 2 illustrates a non-limiting exemplary user interface for one embodiment of visual voicemail unavailability solutions.

FIG. 2 illustrates an exemplary, non-limiting user device displaying alternate voicemail access instructions. User device 200 may be any type of communications device, including a wireless telephone, portable computer, PDA, wired telephone, desktop or laptop computer, or any other type of device capable of implementing the present subject matter. User device 200 may be configured with a visual voicemail client, such as visual voicemail client 112 or 122, or other component that may be configured to present alternate voicemail access instruction 220 to a user on display 210. Note that in other embodiments, alternate voicemail access instruction 220, or other alternate voicemail access instructions, may be presented to a user using alternative communication means, including any type of display, audio component such as a speaker, or any other communication means or combination thereof. All such embodiments are contemplated as within the scope of the present disclosure.

Alternate voicemail access instruction 220 may simply provide an instruction on how to access voicemail using a system other than a visual voicemail client. For example, alternate voicemail access instruction 220 may provide a phone number that a user can call to access voicemail and related data. Alternatively, alternate voicemail access instruction 220 may provide a key or combination of keys that can be activated to connect a user to a voicemail system. In another embodiment, alternate voicemail access instruction 220 may include a link or other software construct that can be activated by a user and, when activated, instructs user device 200 to place a call to or otherwise communicate with a voicemail system. Alternate voicemail access instruction 220 may be presented to a user until acknowledged by the user, or for a predetermined amount of time before being removed from display 210. Alternatively, a large version of alternate voicemail access instruction 220 may be presented to a user for a predetermined amount of time, and then a smaller version or alternate indicator may be presented to a user upon expiration of the predetermined amount of time. Any other means of presenting alternate voicemail access instruction 220 may be used, and all such embodiments are contemplated as within the scope of the present disclosure.

Figure 3:
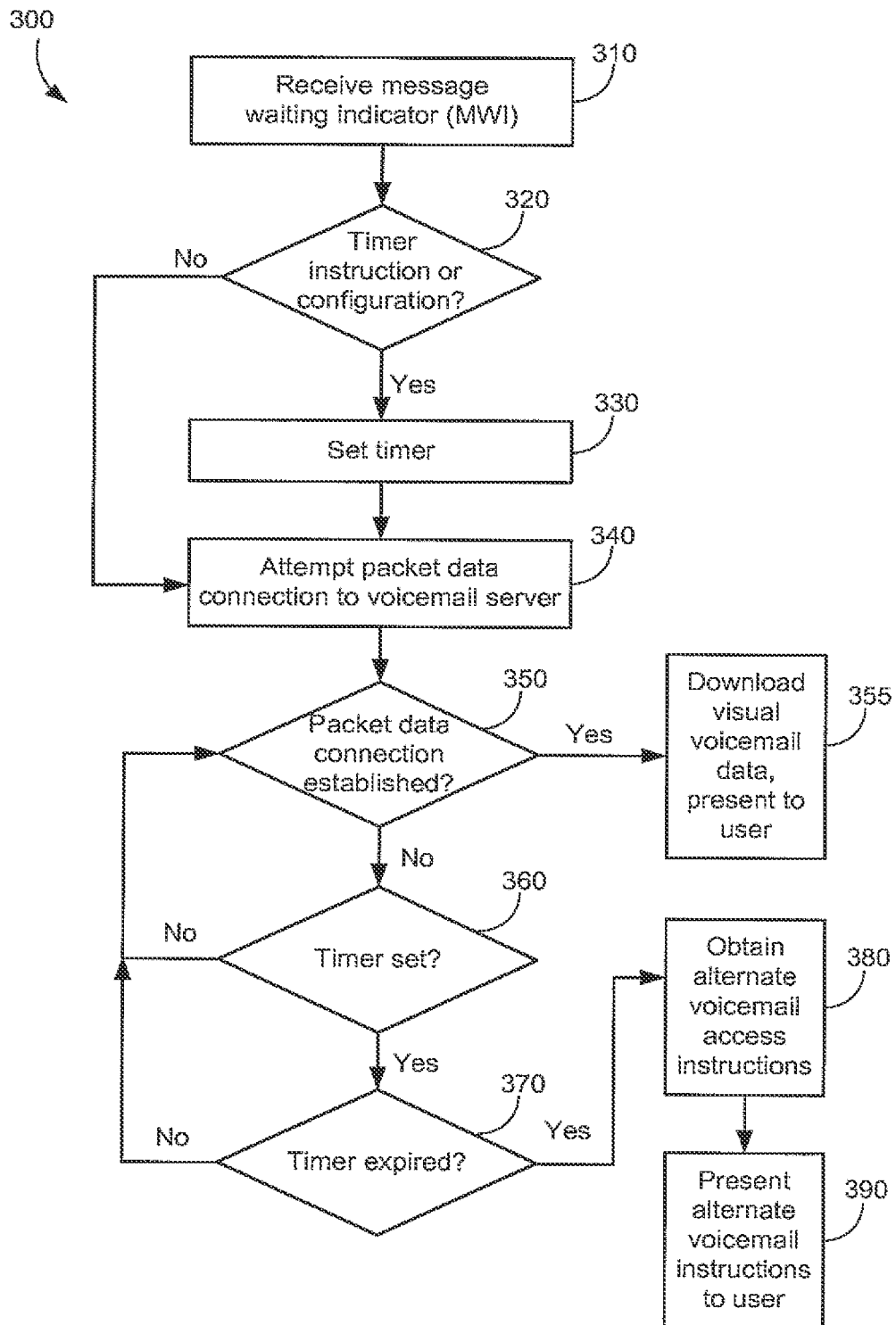
FIG. 3 illustrates a non-limiting exemplary method of implementing visual voicemail unavailability solutions.

FIG. 3 illustrates method 300 of implementing some embodiments of the presently disclosed visual voicemail unavailability solution. Method 300 may be performed on any recipient or end user device, including a wireless device such as a mobile telephone, PDA, wireless computer, etc., a wired device such as a telephone or computer, or on any other device configured to operate a visual voicemail client or similar software, and/or to interact with a visual voicemail system. At block 310, a message waiting indicator (MWI) is received. This may be in the form of an SMS message, another message sent using SMPP, or in any other effective form.

At block 320, a determination is made as to whether a timer should be set. On one embodiment the recipient device may be configured to set a timer upon detecting an instruction within the received MWI to do so. Alternatively, the recipient device may be configured to automatically set a timer when a particular type or form of MWI is received and/or detected, or when any MWI is received and/or detected. If the recipient device is not configured to set a timer, the method continues at block 340 where an attempt is made to establish a packet data communications session with a voicemail server. If, at block 320, it is determined that the recipient device is configured to set a timer, at block 330 the timer is set. The timer may be set to an amount of time instructed in the received MWI, or it may be set to a predetermined amount of time configured in the recipient device's voicemail client or other component of the recipient device. The amount of time may be user or provider configurable, or may be set to a predetermined amount of time that cannot be changed.

At block 340 the recipient device attempts to set up a packet data connection to a voicemail server. This may involve requesting the activation of a PDP context, requesting the establishment of a TCP session, and/or attempting to establish a packet data communications session or connection using any other means or protocols. At block 350, a determination may be made as to whether a packet data connection has been established. If so, at block 355 a normal visual voicemail data exchange may occur, and visual voicemail data may be downloaded or otherwise obtained from a voicemail server and/or other devices in a voicemail system and presented to a user, for example with a visual voicemail client configured on the recipient device.

If a packet data connection or communications session has not been established, at block 360 a determination is made as to whether a timer has been set. If no timer has been set, the method returns to block 350 for further determination of whether a packet data connection or communications session has not been established. If a timer has been set, for example at block 330, at block 370 a determination is made as to whether the timer has expired. If the timer has not expired, at block 350 further determination of whether a packet data connection or communications session has not been established is performed.

If the timer has expired, at block 380 alternate voicemail access instructions are obtained or otherwise generated. Alternate voicemail access instructions may be obtained from the MWI received at block 310, may be obtained from a storage medium, such as memory or disk, of the recipient device, or from another source such as a network device configured to provide alternate voicemail access instructions. Once obtained, alternate voicemail access instructions may be processed, altered, modified, or otherwise manipulated as needed, or not at all. At block 390 such instructions are presented to a user.

Note that at block 390 evaluations may be performed to determine how and when to present the alternate voicemail access instructions to a user. For example, a user may be able to configure a voicemail client or a recipient device to present such instructions audibly or visually. Alternatively, a user may be able to configure a voicemail client or a recipient device to present such instructions during set periods of time or under certain conditions. In yet another embodiment, a user may configure a voicemail client or recipient device to present such instructions in certain ways if certain conditions are met. For example, during certain hours a user may wish to receive alternate voicemail access instructions audibly while during other hours a user may wish to receive such instructions graphically. In another embodiment, a user may configure a voicemail client to evaluate the user's location as obtained on the recipient device using the global positioning system (GPS), triangulation, etc., and present alternate voicemail instructions in a particular format when the device is in one area, and a different format when the device is on another area. For example, when a user is at work, he or she may wish to receive visual messages only, but while outside of work, the user may wish to receive audible messages. Any other combination or implementation of presenting alternate voicemail access instructions to a user may be used, and all such implementations are contemplated as within the scope of the present disclosure. Note also that at blocks 380 and/or 390, a visual voicemail client may be instructed to, or may be automatically configured to, cease attempts to connect to a voicemail server, thereby conserving resources.

In an alternate embodiment, a recipient device may successfully connect to and establish a communications session with a voicemail server, but for some reason the connection may be lost or otherwise unavailable before the needed voicemail data is fully downloaded. In such an embodiment, a recipient device may be configured to detect the ceasing of receipt of voicemail data and, upon such a detection, may set a timer such as that set at block 330. Upon expiration of such a timer, if data connectivity has not been restored, then alternate voicemail access instructions may be presented to the user. Alternatively, upon establishment of a packet data connection with a voicemail server, a recipient device may set a timer for a time period estimated to be longer than the total amount of time that the communications session with the voicemail server is expected to take. If such a timer expires before all needed voicemail data is downloaded, then alternate voicemail access instructions may be presented to the user. Any other conditions for setting a timer and then presenting alternate voicemail access instructions to a user may be used, and all such embodiments are contemplated as within the scope of the present disclosure.

Figure 4:
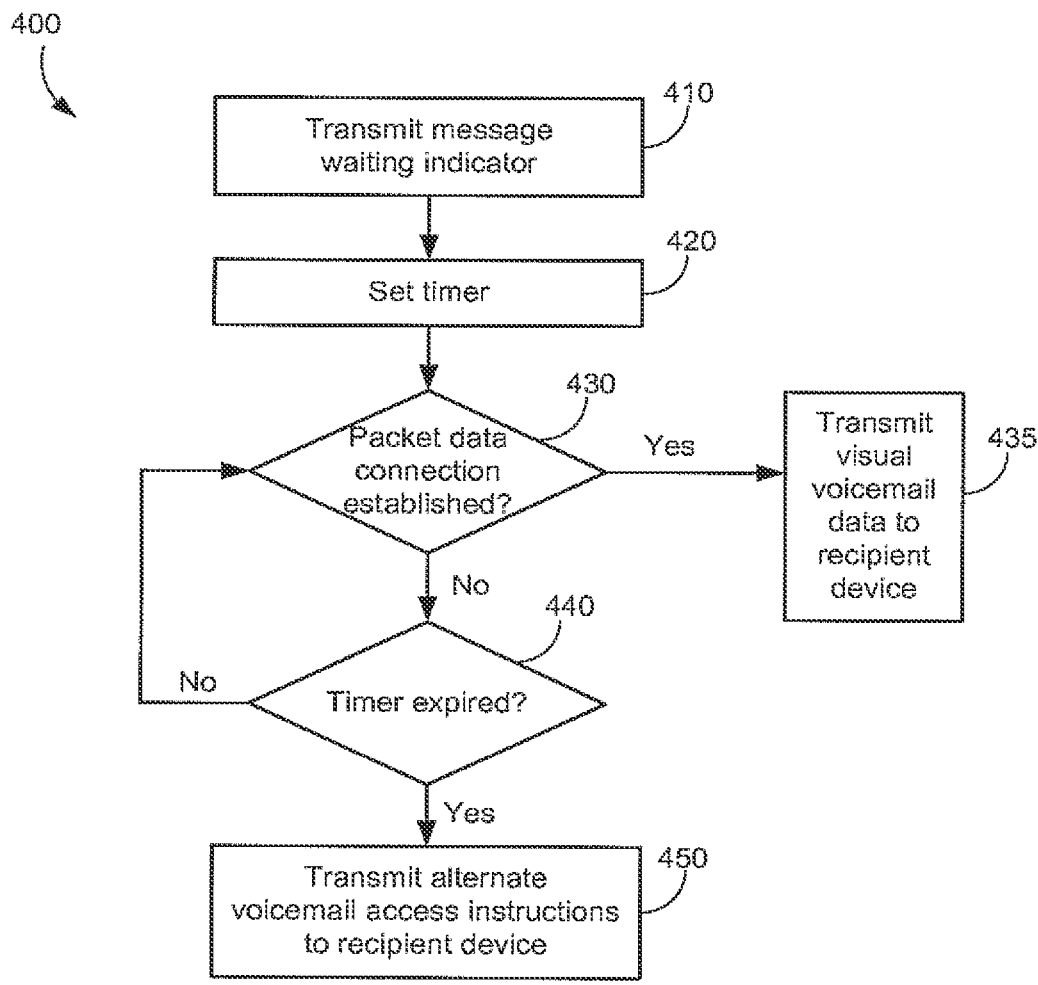
FIG. 4 illustrates another non-limiting exemplary method of implementing visual voicemail unavailability solutions.

FIG. 4 illustrates method 400 of implementing some embodiments of the presently disclosed visual voicemail unavailability solution. Method 400 may be performed on any network or voicemail system device, including a voicemail server or any other device configured to operate within a visual voicemail system. At block 410, a message waiting indicator (MWI) may be transmitted to a recipient device. This may be in the form of an SMS message, another message sent using SMPP, or in any other effective form.

At block 420 a timer may be set. The timer may be set to any amount of time, and the amount of time may be configured by a user through a recipient device's voicemail client that transmits such preferences to a voicemail server or system, by an administrator of a visual voicemail system, or any other permitted entity or device. The amount of time may be set to a predetermined amount of time that cannot be changed once set or may be capable of being changed after initial setting.

At block 430 a determination is made as to whether a packet data connection or communications session has been established. This determination may be made based on a determination as to whether a transport layer session has been established, such as a TCP session, a PDP context has been activated, or may be based on any other criteria. If a communications session has been successfully established, at block 435 a normal visual voicemail data exchange may occur, and visual voicemail data may be transmitted from a voicemail server and/or other device in a voicemail system to a user device, for example, for use by a visual voicemail client. If a packet data connection has not been established, at block 440 a determination is made as to whether the timer has expired. If not, the method returns to block 430 to determine whether a packet data connection has been established.

If at block 440 it is determined that the timer has expired, then at block 450, a message containing alternate voicemail access instructions may be transmitted to the recipient device. This may be in the form of a text or SMS message and may contain information on dialing into a voicemail server or otherwise accessing voicemail data. The message may be in any other effective form as well. Alternatively, in some embodiments, a visual voicemail client on a recipient device may be preconfigured with an alternate voicemail access message. In such an embodiment, at block 450 a message may be sent to the recipient device containing an instruction directing the recipient device to present the preconfigured alternate voicemail access message to the user. Any other combination of messages, instructions, and devices may be used, and all such embodiments are contemplated as within the scope of the present disclosure.

The methods and systems described above assist in notifying users of alternate voicemail access means when a connection with a visual voicemail server is unavailable for any reason. By notifying clients and user devices of these alternate means, users will be able to access voicemail even in the event of network outages or equipment failures that prevent the downloading of visual voicemail data. This increases user access to voicemail and helps reduce the resources needed to deal with network outages because, rather than calling a help desk or customer service, many users will elect to retrieve their voicemail using the alternate means described in instruction messages. Set forth below are exemplary systems, devices, and components in which aspects of the present disclosure may be implemented.

Figure 5:
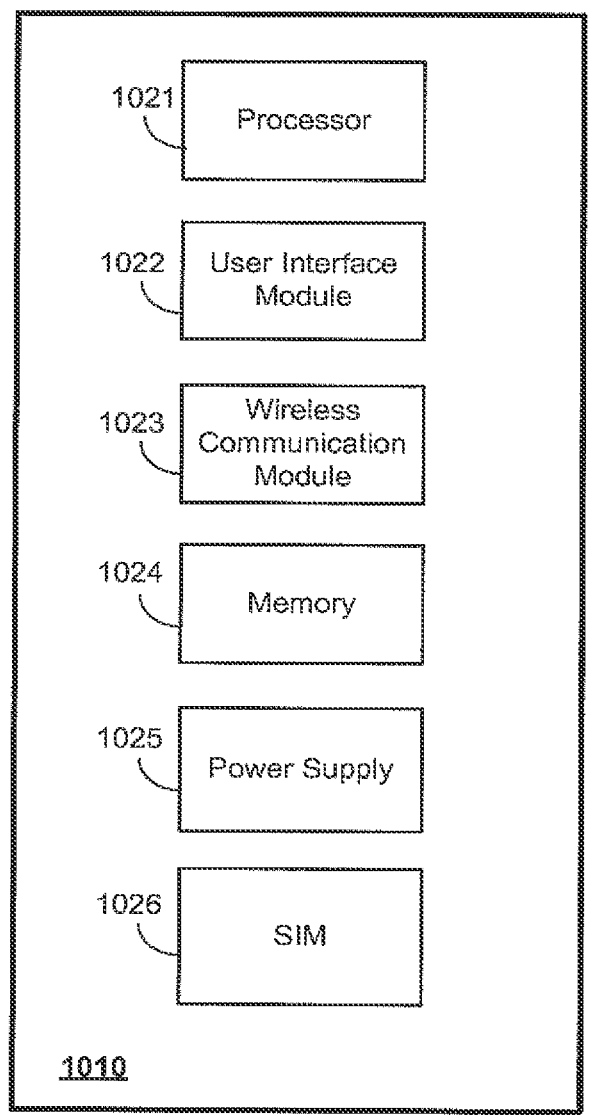
FIG. 5 is a block diagram of a non-limiting, exemplary wireless device that may be used in connection with visual voicemail unavailability solutions.

FIG. 5 illustrates an example wireless device 1010 that may be used in connection with an embodiment. References will also be made to other figures of the present disclosure as appropriate. For example, wireless devices 111 and 121 and user device 200 may each be a wireless device of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to visual voicemail data communications, for example. User interface module 1022 may be any type or combination of hardware and/or software that enables a user to operate and interact with wireless device 1010, and, in one embodiment, to interact with a system or software enabling the user to place, request, and/or receive calls, voicemail, voicemail notifications, voicemail data, and/ or a system or software enabling the user to create, view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 101, voicemail server 130, and/or RNC 140, or any other type of wireless communications network or network equipment. Memory 1024 enables wireless device 1010 to store information, such as voicemail notifications, visual voicemail client software, visual voicemail data, multimedia content, software to interact with voicemail systems and network devices, and voicemail preferences. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
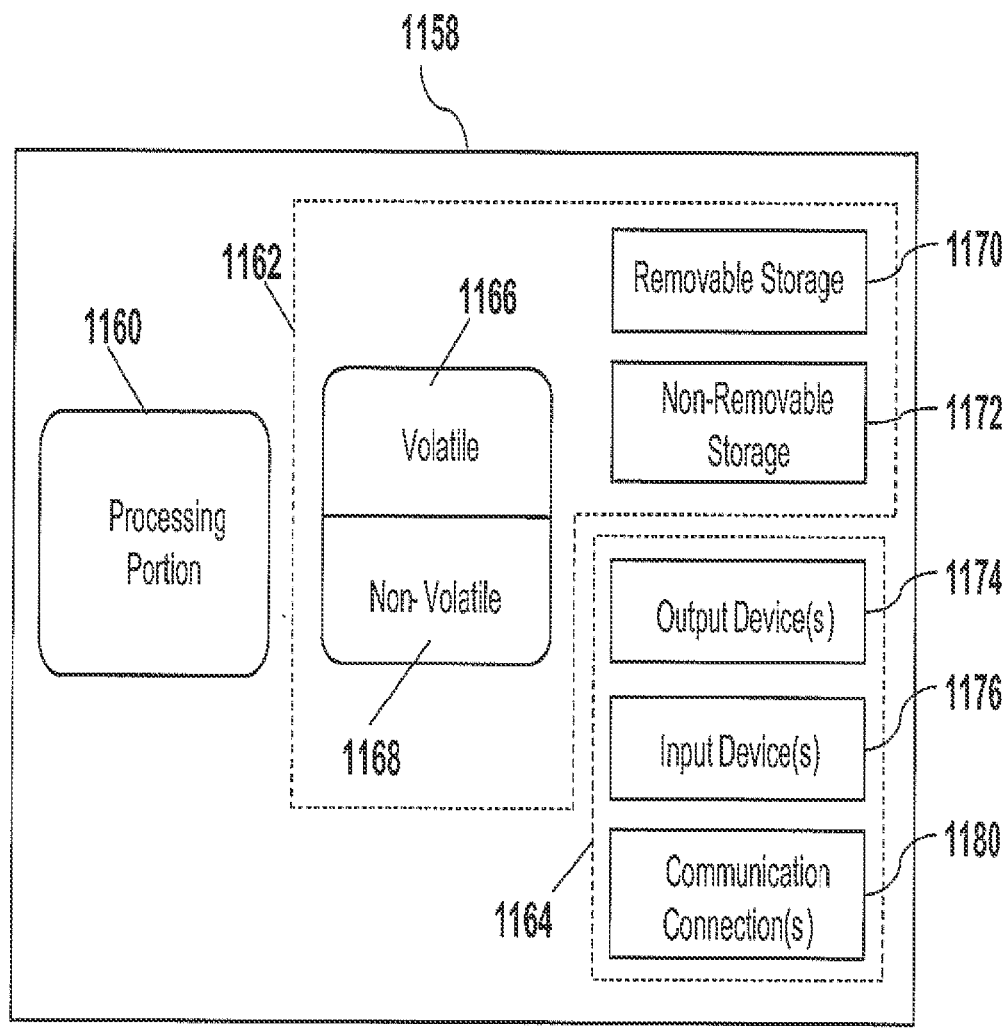
FIG. 6 is a block diagram of a non-limiting, exemplary processor in which visual voicemail unavailability solutions may be implemented.

FIG. 6 is a block diagram of an example processor 1158 which may be employed in any of the embodiments described herein, including as one or more components of wireless devices 111 and 121 and user device 200, as one or more components of network equipment or related equipment, such as any component of network 101 shown in FIG. 1, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, establish and terminate visual voicemail data communications, transmit and receive voicemail notifications and data, transmit, receive, store and process voicemail content, execute software to interact with voicemail systems, receive and store voicemail preferences, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, voicemail data, calls, other telephonic communications, etc. For example, the memory portion is capable of storing voicemail preferences and/or software capable of processing call requests, operating a visual voicemail client, receiving calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIG. 1. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 101 illustrated in FIG. 1 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how visual voicemail data communications may be implemented with stationary and non-stationary network structures and architectures in order to provide integration of multimedia content with voicemail. It can be appreciated, however, that visual voicemail data communications such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for the disclosed visual voicemail unavailability solution can be applied independently of the method of data transport, and do not depend on any particular network architecture, or underlying protocols.

Figure 7:
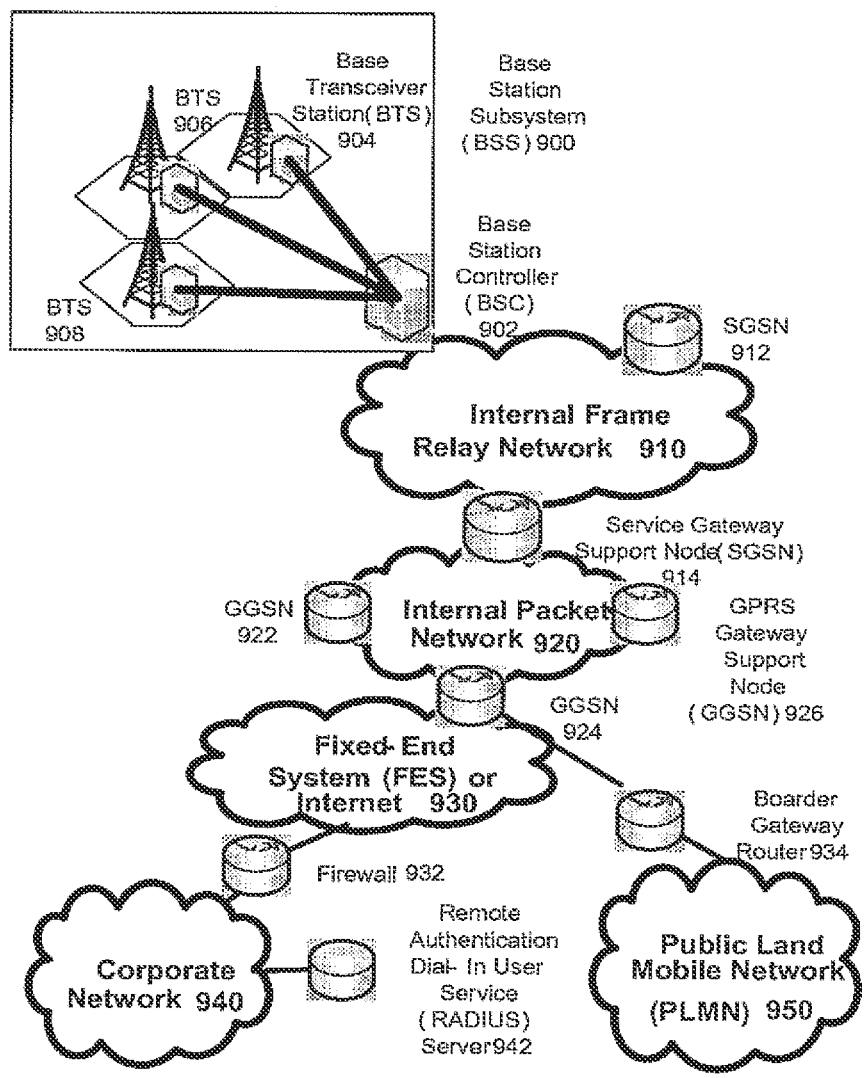
FIG. 7 is a block diagram of an exemplary packet-based mobile cellular network environment, such as a GPRS network, in which visual voicemail unavailability solutions may be implemented.

FIG. 7 depicts an overall block diagram of an exemplary packet-based mobile cellular network environment, such as a GPRS network, in which the systems and methods for the visual voicemail unavailability solutions such as those described herein can be practiced. In an example configuration, network 101 as illustrated in FIG. 1 may be encompassed by or interact with the network environment depicted in FIG. 7. Similarly, wireless devices 111 and 121 and user device 200 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless devices 111 and 121 and user device 200) become connected to the wireless network. In exemplary fashion, the packet traffic originating from user devices (e.g., wireless devices 111 and 121 and user device 200) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
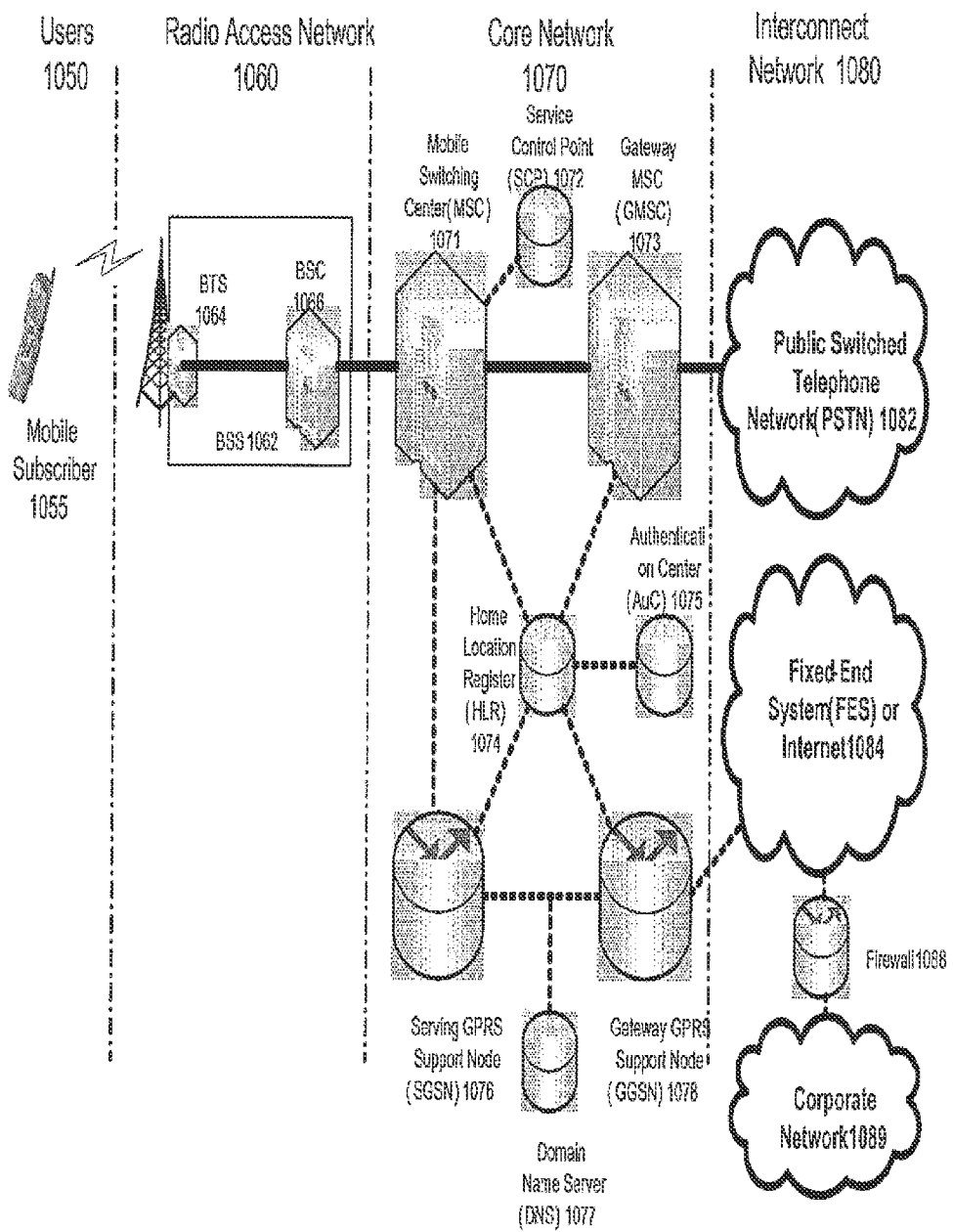
FIG. 8 illustrates a non-limiting, exemplary architecture of a typical GPRS network, segmented into four groups, in which client visual voicemail unavailability solutions may be implemented.

FIG. 8 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 8). In an example embodiment, the device depicted as mobile subscriber 1055 may comprise wireless devices 111 and 121 and user device 200. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless devices 111 or 121 and user device 200, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of visual voicemail unavailability solutions such as those described herein can include but are not limited to Gateway GPRS Support Node tables, Fixed End System router tables, firewall systems, VPN tunnels, and any number of other network elements as required by the particular digital network.

Figure 9:
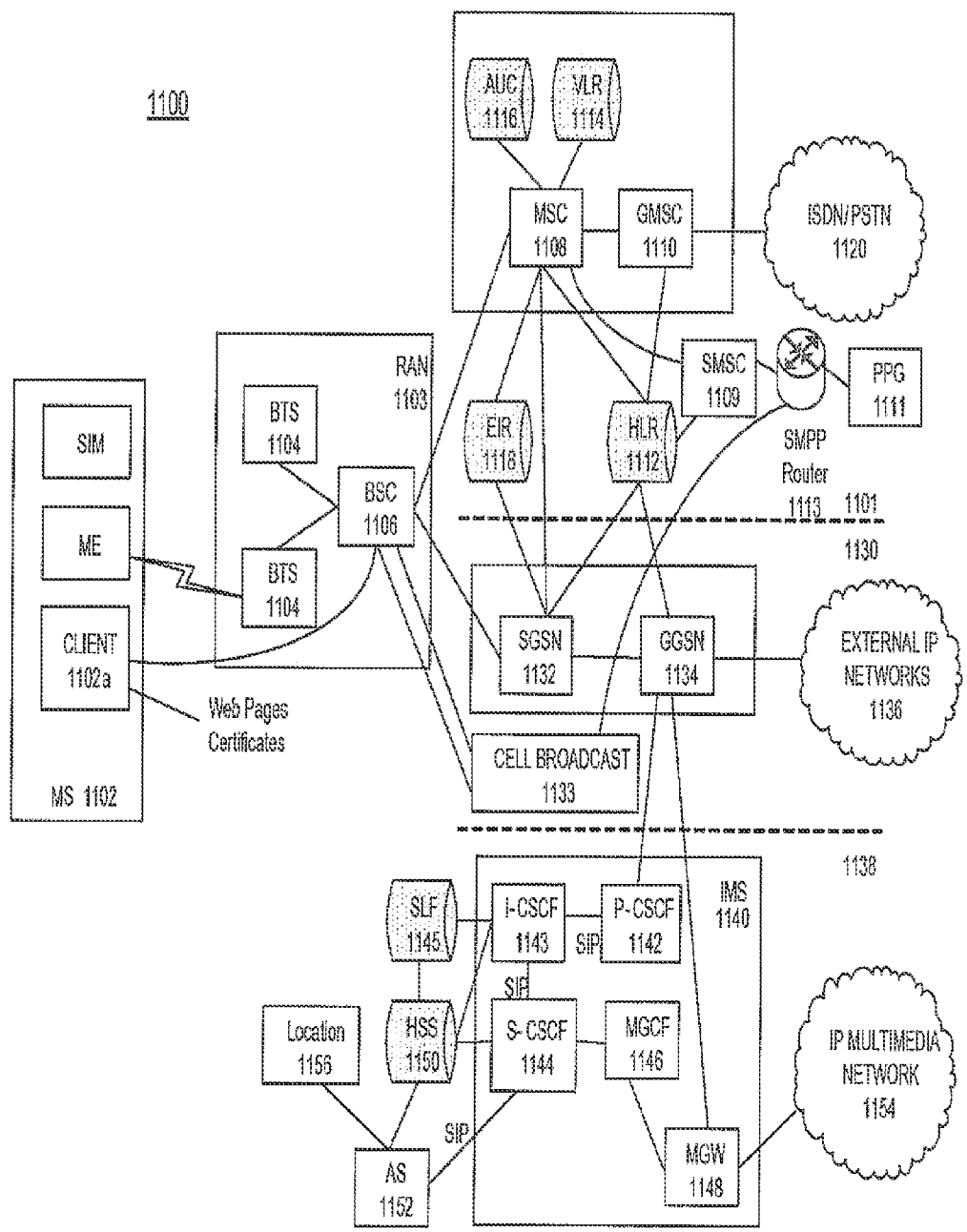
FIG. 9 illustrates a non-limiting alternate block diagram of an exemplary GSM/GPRS/IP multimedia network architecture in which visual voicemail unavailability solutions may be implemented.

FIG. 9 illustrates another exemplary block diagram view of a GSM/GPRS/IP multimedia network architecture 1100 in which the systems and methods of visual voicemail unavailability solutions such as those described herein can be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless devices 111 and 121 and user device 200) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of systems and methods for visual voicemail unavailability solutions have been described in connection with various communications devices and computing devices/processors, the underlying concepts can be applied to any communications or computing device, processor, or system capable of implementing the visual voicemail unavailability solutions described herein. The various techniques described herein can be implemented in connection with hardware or software or, where appropriate, with a combination of both. Thus, the methods and apparatuses for visual voicemail unavailability solutions, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a visual voicemail unavailability solution. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for visual voicemail unavailability solutions can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a visual voicemail unavailability solution. When implemented on a general-purpose processor, the program code combines with the processor to provide a unique apparatus that operates to invoke the functionality of visual voicemail unavailability solutions as described herein. Additionally, any storage techniques used in connection with a visual voicemail system can invariably be a combination of hardware and software.

While visual voicemail unavailability solutions have been described in connection with the various embodiments of the various figures, it is to be understood that other similar embodiments can be used or modifications and additions can be made to the described embodiment for performing the same function of providing visual voicemail unavailability solutions without deviating therefrom. For example, one skilled in the art will recognize that visual voicemail unavailability solutions as described in the present application may apply to any environment, whether wired or wireless, and may be applied to any number of such devices connected via a communications network and interacting across the network. Therefore, visual voicemail unavailability solutions should not be limited to any single embodiment, but rather should be construed in breadth and scope in accordance with the appended claims.

What is claimed is:

1. A method comprising:
    receiving visual voicemail content at a visual voicemail server;
    transmitting a new message notification from the visual voicemail server to a wireless device;
    setting a timer at the visual voicemail server;
    determining, at the visual voicemail server, that the timer has expired and that a data communications connection has not been established between the wireless device and the visual voicemail server; and
    responsive to determining that the timer has expired and that the data communications connection has not been established between the wireless device and the visual voicemail server, transmitting an alternate voicemail access instruction from the visual voicemail server to the wireless device.

2. The method of claim 1, wherein the alternate voicemail access instruction comprises an instruction to present an alternate voicemail access message on the wireless device, wherein the alternate voicemail access message is preconfigured on the wireless device.

3. The method of claim 2, wherein transmitting the new message notification comprises transmitting the new message notification comprising the alternate voicemail access message.

4. The method of claim 2, wherein the alternate voicemail access instruction is stored in a memory on the wireless device.

5. The method of claim 1, wherein determining that the data communications connection has not been established between the wireless device and the visual voicemail server comprises determining that a packet data protocol context has not been activated for the wireless device.

6. The method of claim 1, wherein determining that the data communications connection has not been established between the wireless device and the visual voicemail server comprises determining that a transport control protocol session has not been established between the wireless device and the visual voicemail server.

7. The method of claim 1, wherein transmitting the new message notification comprises transmitting a short message service message comprising the new message notification.

8. A system comprising:
    a transceiver;
    a memory comprising computer instructions;
    a processor coupled to the memory, wherein the processor, when executing the computer instructions, the processor effectuates operations comprising:
        transmitting a new message notification to a wireless device;
        setting a timer;
        determining that the timer has expired and that a data communications connection has not been established between the wireless device and the visual voicemail server; and
        responsive to determining that the timer has expired and that the data communications connection has not been established between the wireless device and the visual voicemail server, transmitting an alternate voicemail access instruction to the wireless device.

9. The system of claim 8, wherein the alternate voicemail access instruction comprises an instruction to present an alternate voicemail access message on the wireless device, wherein the alternate voicemail access message is preconfigured on the wireless device.

10. The system of claim 9, wherein the new message notification comprises the alternate voicemail access message.

11. The system of claim 9, wherein the alternate voicemail access instruction is stored in a memory on the wireless device.

12. The system of claim 8, wherein the operation of determining that the data communications connection has not been established between the wireless device and the visual voicemail server comprises determining that a packet data protocol context has not been activated for the wireless device.

13. The system of claim 8, wherein determining that the data communications connection has not been established between the wireless device and the visual voicemail server comprises determining that a transport control protocol session has not been established between the wireless device and the visual voicemail server.

14. The system of claim 8, wherein the new message notification is a short message service message.

15. A tangible computer-readable storage medium comprising computer-executable instructions that, when executed by a processor, cause the processor to effectuate operations comprising:

receiving, via a transceiver, visual voicemail content;

instructing the transceiver to transmit a new message notification to a wireless device;

setting a timer;

determining that the timer has expired and that a data communications connection has not been established between the wireless device and a visual voicemail server; and responsive to determining that the timer has expired and that the data communications connection has not been established between the wireless device and the visual voicemail server, instructing the transceiver to transmit an alternate voicemail access instruction to the wireless device.

16. The tangible computer-readable storage medium of claim 15, wherein the alternate voicemail access instruction comprises an instruction to present an alternate voicemail access message on the wireless device, wherein the alternate voicemail access message is preconfigured on the wireless device.

17. The tangible computer-readable storage medium of claim 16, wherein the new message notification comprises the alternate voicemail access message.

18. The tangible computer-readable storage medium of claim 15, wherein determining that the data communications connection has not been established between the wireless device and the visual voicemail server comprises determining that a packet data protocol context has not been activated for the wireless device.

19. The tangible computer-readable storage medium of claim 15, wherein determining that the data communications connection has not been established between the wireless device and the visual voicemail server comprises determining that a transport control protocol session has not been established between the wireless device and the visual voicemail server.

20. The tangible computer-readable storage medium of claim 15, wherein the new message notification is a short message service message.

* * * * *